(12) United States Patent
Marcinkiewicz et al.

(10) Patent No.: US 7,210,860 B2
(45) Date of Patent: May 1, 2007

(54) ELECTRONIC DEVICES INCLUDING FIBER OPTIC CABLE AND METHODS FOR FORMING THE SAME

(75) Inventors: Walter M. Marcinkiewicz, Chapel Hill, NC (US); Denise K. Sadler, Durham, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 0 days.

(21) Appl. No.: 11/016,524

(22) Filed: Dec. 17, 2004

(65) Prior Publication Data

US 2006/0133738 A1 Jun. 22, 2006

(51) Int. Cl.
*G02B 6/36* (2006.01)
(52) U.S. Cl. .......................................... 385/88; 385/91
(58) Field of Classification Search ............ 385/88–94, 385/147; 382/295, 296, 315
See application file for complete search history.

(56) References Cited

U.S. PATENT DOCUMENTS

| | | | | |
|---|---|---|---|---|
| 3,820,069 | A * | 6/1974 | Krewson et al. ............. | 382/295 |
| 6,608,959 | B2 * | 8/2003 | Jang et al. .................. | 385/136 |
| 6,625,849 | B1 * | 9/2003 | Womack et al. .......... | 24/115 M |
| 6,669,379 | B2 * | 12/2003 | Janosik et al. ................ | 385/91 |
| 6,718,112 | B1 * | 4/2004 | Rodriguez et al. .......... | 385/137 |
| 6,795,632 | B1 | 9/2004 | Knapp et al. | |
| 6,963,680 | B2 * | 11/2005 | Lempkowski et al. ........ | 385/26 |
| 2002/0111194 | A1 * | 8/2002 | Behbahani et al. ......... | 455/566 |
| 2003/0210780 | A1 * | 11/2003 | Pratt et al. ............. | 379/428.01 |
| 2004/0042482 | A1 | 3/2004 | Smith et al. | |
| 2005/0160186 | A1 * | 7/2005 | Ruiz ............................ | 710/1 |

FOREIGN PATENT DOCUMENTS

| | | |
|---|---|---|
| EP | 0 390 303 | 3/1990 |
| EP | 0 390 303 A | * 10/1990 |
| EP | 0 961 370 | 5/1999 |

OTHER PUBLICATIONS

Bivar, Inc., http://news.managingautomation.com/fullstory/5673, Nov. 11, 2004, 3 pages.
Lumitex® Inc., http://www.luminex.com/fiber_optic_technologies.html, Nov. 15, 2004, 6 pages.
Poly-Optical® Products, http://www.poly-optical.com/applications.html, Nov. 11, 2004, 3 pages.
Poly-Optical® Products, http://www.poly-optical.com/lcd_s.html, Nov. 11, 2004, 2 pages.
Poly-Optical® Products, http://www.poly-optical.com/membrane_switches.html, Nov. 11, 2004, 3 pages.
International Search Report and Written Opinion of the International Searching Authority for International patent application No. PCT/US2005/021112 mailed on Oct. 4, 2005.

* cited by examiner

*Primary Examiner*—Quyen Leung
(74) *Attorney, Agent, or Firm*—Myers Bigel Sibley & Sajovec, P.A.

(57) ABSTRACT

A handheld, personal electronic device includes a handheld device housing. An electronic component is disposed in the handheld device housing. A fiber optic cable is routed through the handheld device housing and is operably connected to the electronic component to permit transmission of optical signals to and/or from the electronic component via the fiber optic cable. The device may be a mobile wireless communications device.

38 Claims, 5 Drawing Sheets

ELECTRONIC DEVICES INCLUDING FIBER OPTIC CABLE AND METHODS FOR FORMING THE SAME

FIELD OF THE INVENTION

The present invention relates to electronic devices and, more particularly, to electronic devices including signal transmission cables.

BACKGROUND OF THE INVENTION

Manufacturers and designers of personal electronic devices, such as cellular radiotelephones, frequently seek to reduce the overall dimensions of such devices, while maintaining reliability and performance and reducing manufacturing costs. Various components of such an electronic device generally are operatively connected for transfer of signals or data therebetween. In some cases, a high data transfer rate between the components is required. This requirement may be met, in some cases, by use of a large number of electrical conductors. For example, a plurality of dedicated wires or a flexible wiring tape may be employed to provide a number of leads between the components. However, these connectors may present difficulties with respect to space requirements, reliability and signal capacity, particularly as data transfer rates increase with new devices.

SUMMARY OF THE INVENTION

According to embodiments of the present invention, a handheld, personal electronic device includes a handheld device housing. An electronic component is disposed in the handheld device housing. A fiber optic cable is routed through the handheld device housing and is operably connected to the electronic component to permit transmission of optical signals to and/or from the electronic component via the fiber optic cable. The device may be a mobile wireless communications device.

According to further embodiments of the present invention, a mobile electronic device includes a mobile device housing. A first signal converter including at least one of an optical receiver and an optical transmitter is disposed in and/or on the mobile device housing. A second signal converter including at least one of an optical receiver and an optical transmitter is disposed in and/or on the mobile device housing. A fiber optic cable operatively connects the first and second signal converters to permit transmission of optical signals therebetween via the fiber optic cable. The fiber optic cable is disposed in and/or on the mobile device housing. The device may be a wireless communications device.

According to further embodiments of the present invention, an electronic device includes a device housing assembly including a first housing and a second housing movably coupled to the first housing. A fiber optic cable extends between the first and second housings. The fiber optic cable is adapted to permit transmission of optical signals between the first and second housings via the fiber optic cable. The device housing assembly may include a hinge pivotally connecting the first and second housings and the fiber optic cable extends across the hinge.

According to further embodiments of the present invention, an electronic device includes a device housing and a fiber optic cable secured to the device housing. The fiber optic cable may be embedded into the device housing.

According to method embodiments of the present invention, a method for forming an electronic device includes embedding a fiber optic cable into a device housing. The method may including molding the housing about the fiber optic cable.

DETAILED DESCRIPTION OF EMBODIMENTS OF THE INVENTION

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

As used herein the expression "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, "electronic component" means an active device as contrasted with a passive electrical connector or the like. An electronic component may include a processor.

Embodiments of the present invention will now be described below with respect to FIGS. 1–10. Embodiments of the present invention provide electronic devices incorporating fiber optic cables for transmission of signals between electronic components.

The present invention is described below with reference to schematic and block diagrams of electronic devices including fiber optic cables according to some embodiments of the present invention. Although the electronic devices are discussed herein as being included as part of a mobile wireless communication terminal, for example, the mobile terminal 100 of FIGS. 1–7, embodiments of the present invention are not limited to this configuration. As discussed below, various aspects of the present invention may be incorporated into other types of devices including, for example, mobile devices that are not wireless communication terminals or non-portable electronic devices, without departing from the scope of the present invention.

Figure 1:
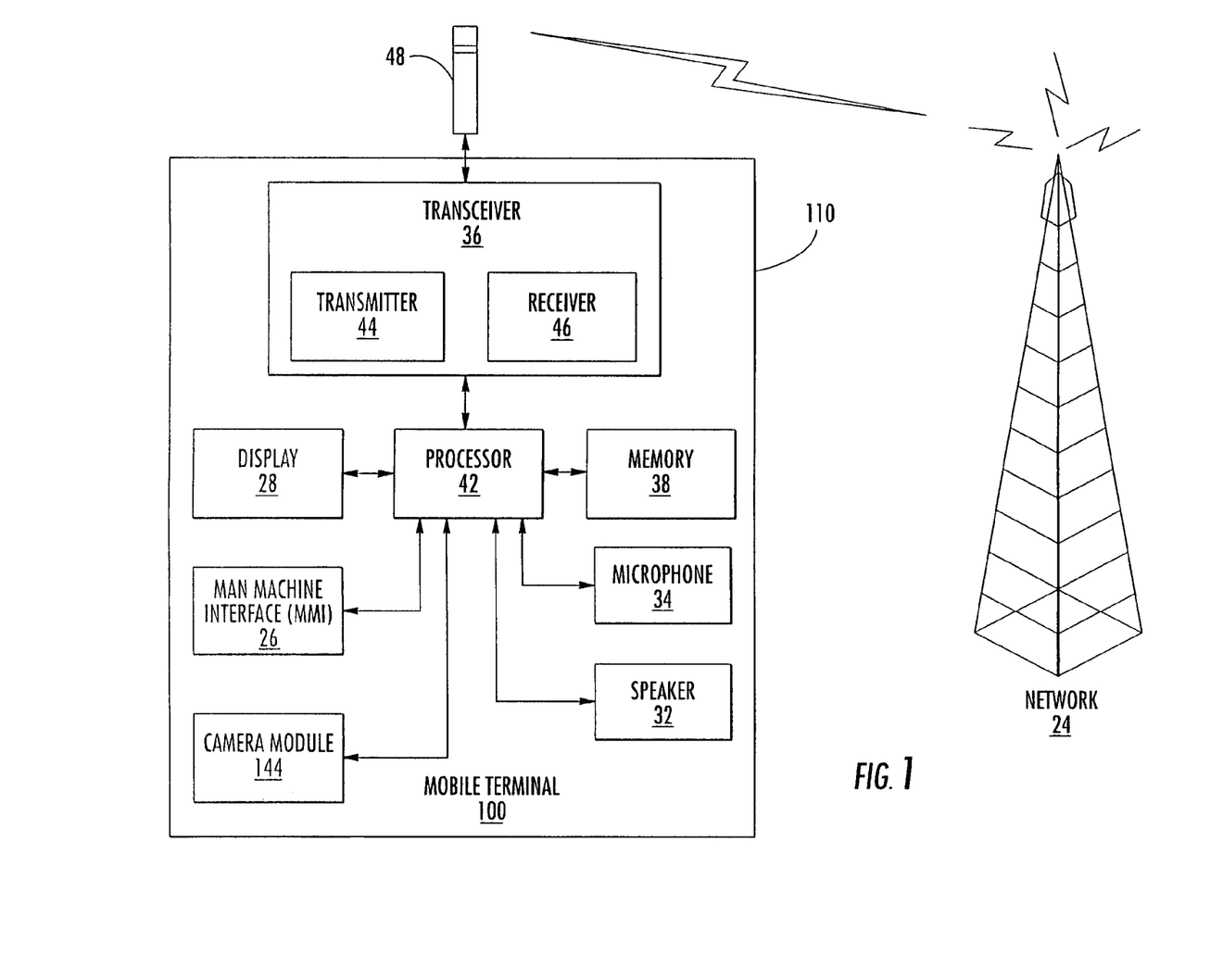
FIG. 1 is a schematic diagram of a mobile terminal according to some embodiments of the present invention and an exemplary base station transceiver.

Referring now to FIG. 1, an exemplary radiotelephone communication system, in accordance with embodiments of the present invention is illustrated, which includes the mobile wireless communication terminal 100 and a base station transceiver, which is part of a wireless communications network 24. In some embodiments of the present invention, the network 24 includes a base station transceiver that includes the radio transceiver(s) that define an individual cell in a cellular network and communicates with the mobile terminal 100 and other mobile terminals in the cell using a radio-link protocol. It will be understood that, in some embodiments of the present invention, many base station transceivers may be connected through, for example, a mobile switching center and other devices to define a wireless communications network.

The mobile terminal 100 includes a portable housing assembly 110 and may include a man machine interface (MMI) 26, a display 28, a speaker 32, a microphone 34, a transceiver 36, and a memory 38 including application information and parameters, any of which may communicate with a processor 42. The MMI 26 may include a keyboard/keypad, for example. Furthermore, the mobile terminal 100 according to embodiments of the present invention may further include a digital camera module 144, which also communicates with the processor 42. The processor 42 can be any commercially available or custom microprocessor, for example.

The transceiver 36 typically includes a transmitter circuit 44 and a receiver circuit 46, which respectively transmit outgoing radio frequency signals to the network 24 and receive incoming radio frequency signals, such as voice and data signals, from the network 24 via an antenna 48. The antenna 48 may be an embedded antenna, a retractable antenna or any antenna known to those having skill in the art without departing from the scope of the present invention. The radio frequency signals transmitted between the mobile terminal 100 and the network 24 may include both traffic and control signals (e.g., paging signals/messages for incoming calls), which are used to establish and maintain communication with another party or destination. The processor 42 may support various functions of the mobile terminal 100, including capture and processing of images using the camera module 144.

The foregoing components of the mobile terminal 100 may be included in many conventional mobile terminals and their functionality is generally known to those skilled in the art. As used herein, the term "portable electronic device" or "mobile terminal" may include: a cellular radiotelephone with or without a multi-line display; a Personal Communications System (PCS) terminal that may combine a cellular radiotelephone with data processing, facsimile and data communications capabilities; a Personal Data Assistant (PDA) that can include a radiotelephone, pager, Internet/intranet access, Web browser, organizer, calendar and/or a global positioning system (GPS) receiver; a gaming device, an audio video player, and a conventional laptop and/or palmtop portable computer that may include a radiotelephone transceiver.

Figure 2:
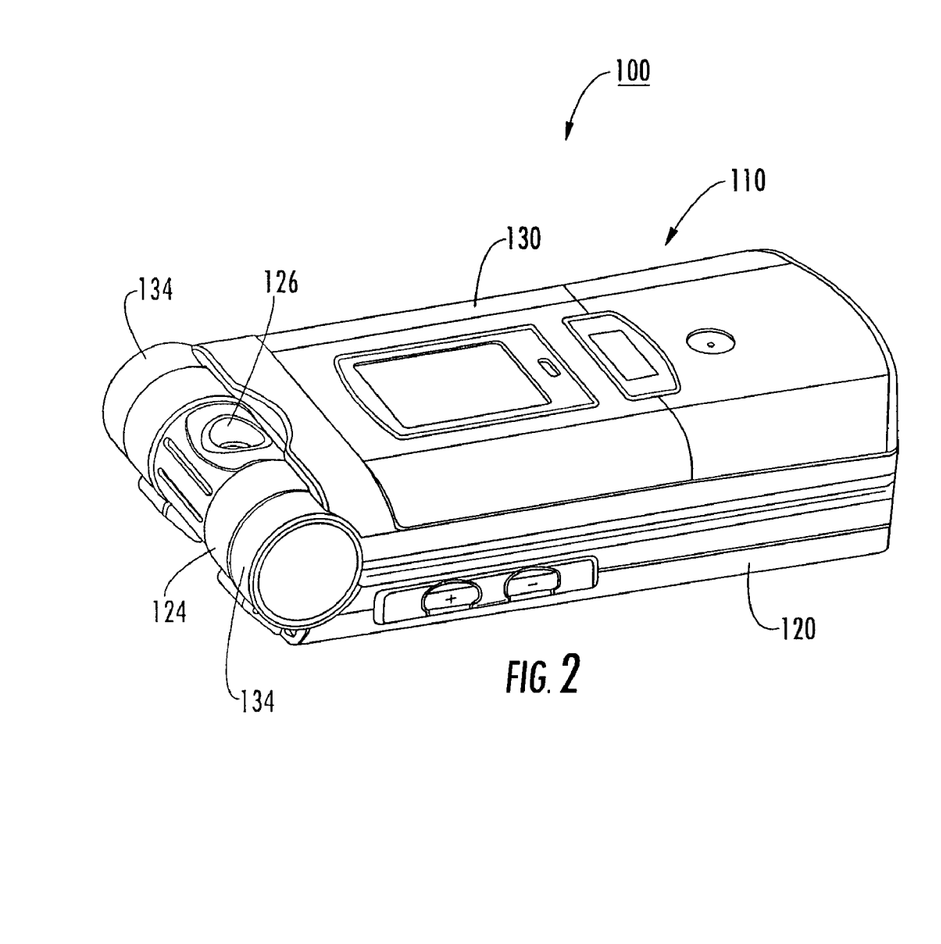
FIG. 2 is a perspective view of the mobile terminal of FIG. 1 in a closed position.
Figure 3:
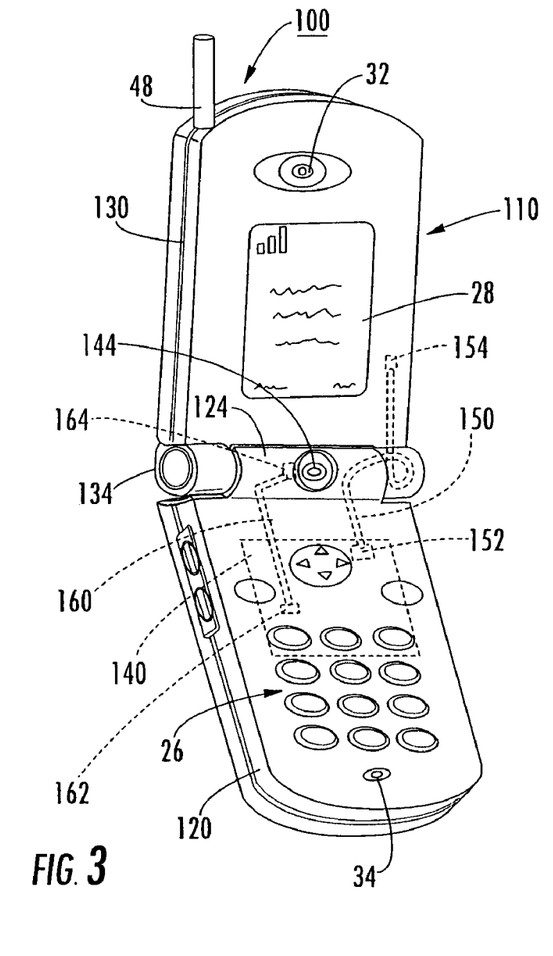
FIG. 3 is a perspective view of the mobile terminal of FIG. 1 in an open position.

According to some embodiments and as illustrated in FIGS. 2 and 3, the mobile terminal 100 is a handheld (portable) mobile terminal. By "handheld mobile terminal", it is meant that the outer dimensions of the mobile terminal are adapted and suitable for use by a typical operator using one hand. According to some embodiments, the total volume of the handheld mobile terminal is less than about 200 cc. According to some embodiments, the total volume of the handheld terminal is less than about 150 cc. According to some embodiments, the total volume of the handheld mobile terminal is between about 20 and 150 cc. According to some embodiments, no dimension of the handheld mobile terminal 100 exceeds about 200 mm.

Figures 4, 6:
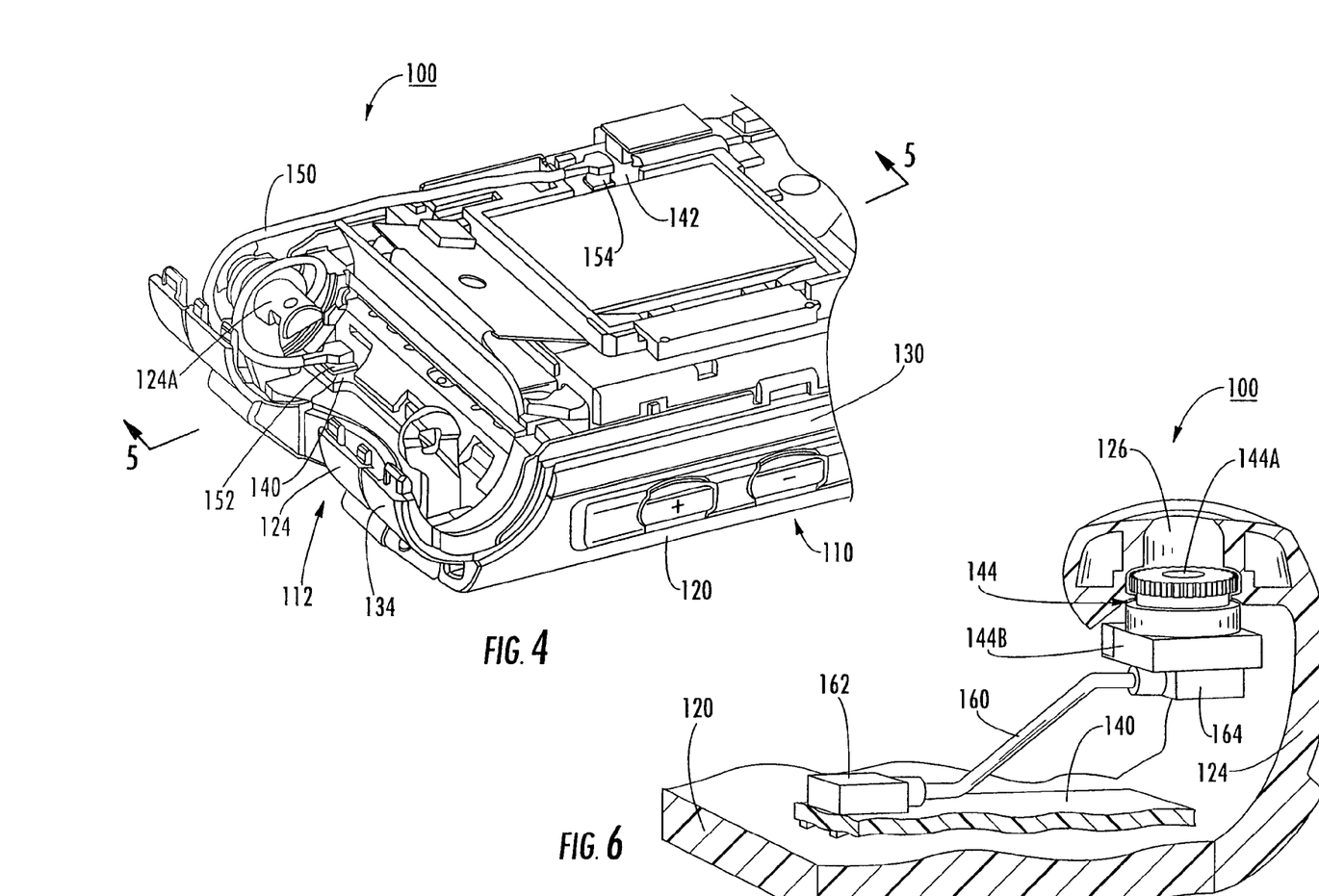
FIG. 4 is a fragmentary, enlarged, perspective view of the mobile terminal of FIG. 1 in the closed position and showing a fiber optic cable and signal converters forming parts thereof.
FIG. 6 is a fragmentary, enlarged, perspective view of the mobile terminal of FIG. 1 showing a further fiber optic cable, signal converters and a camera module forming parts thereof.
Figures 5, 7:
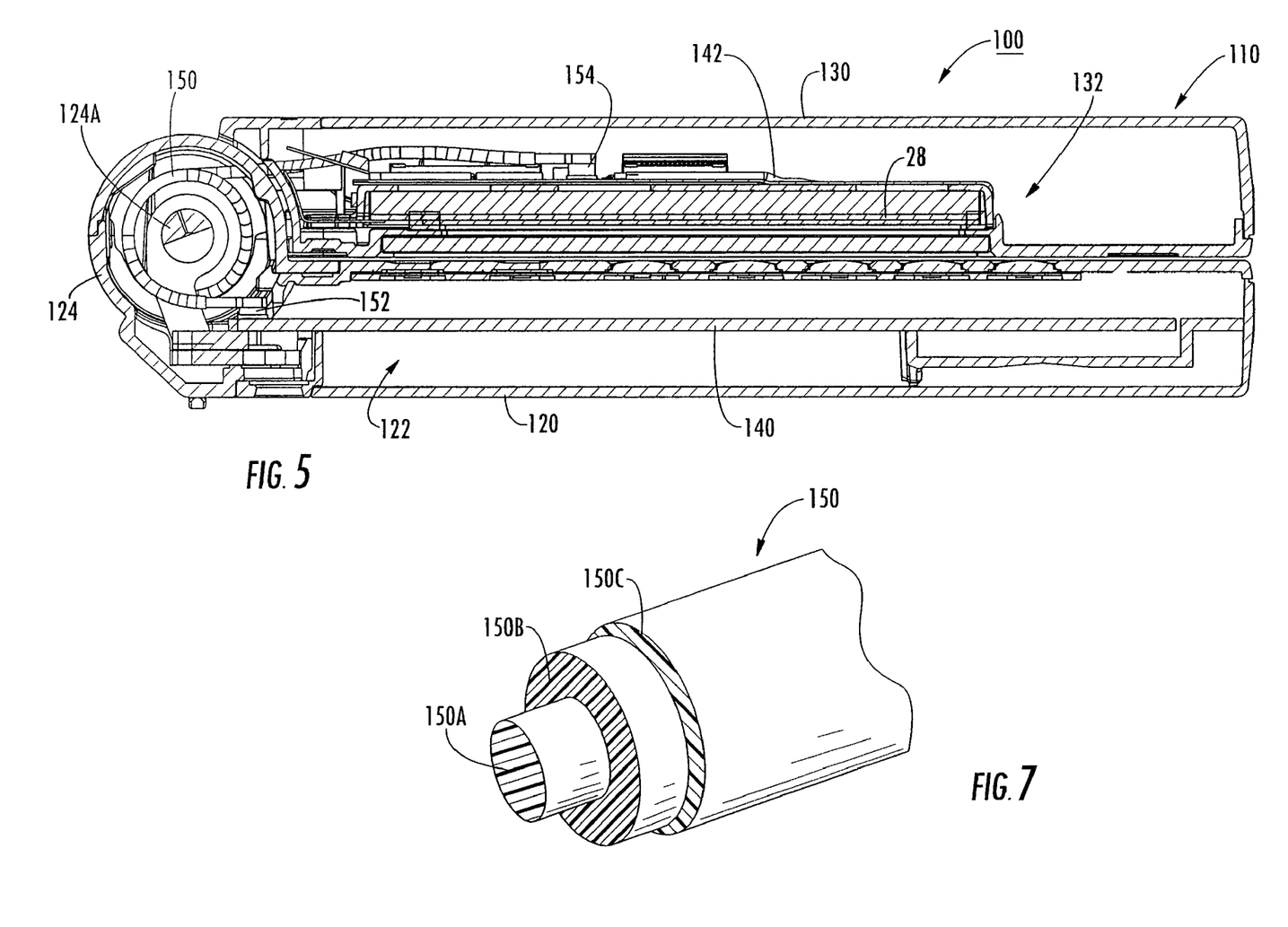
FIG. 5 is a simplified cross-sectional view of the mobile terminal of FIG. 1 in a closed position and taken along the line 5—5 of FIG. 4.
FIG. 7 is a fragmentary, perspective view of a fiber optic cable forming a part of the mobile terminal of FIG. 1.

Turning to the housing assembly 110 in more detail, the housing assembly 110 includes a lower or main housing 120 and an upper housing 130 pivotally joined by a hinge 112. The housings 120, 130 can be relatively pivoted about the hinge 112 between a closed position as shown in FIGS. 2, 4 and 5 and an open position as shown in FIG. 3. The configuration of the housing assembly 110 is commonly referred to as a "clamshell housing." Handheld wireless communication terminals having clamshell housings are commonly referred to as "flip phones."

The housing 120 defines an interior cavity 122 and a hinge portion 124 having a pivot extension 124A. A camera opening 126 is defined in the hinge portion 124. The housing 130 defines an interior cavity 132 and has a hinge portion 134. The hinge portions 124, 134 are cooperatively engaged to form the hinge 112, which movably couples the housings 120, 130.

The housings 120, 130 may be formed of a polymeric material, such as polystyrene. Alternatively or additionally, the housings 120, 130 may be formed of any other suitable material, such as metal. The housings 120, 130 may be molded and may each be assembled from multiple parts.

As shown in FIGS. 3–5, a printed wiring board (PWB) or printed circuit board (PCB) 140 is disposed in the cavity 122 of the lower housing 120. The PCB 140 may include all or a portion of the processor 42, for example. The display 28 is mounted in the upper housing 130. A printed wiring board or printed circuit board (PCB) 142 is disposed in the cavity 132 of the upper housing 130 and connected to the display 28 and is operable to control the display 28. The PCB 142 may include a processor associated with the display 28. The display 28 may be, for example, a liquid crystal display (LCD).

A fiber optic cable 150 extends from the PCB 140 to the PCB 142. More particularly, the fiber optic cable 150 extends through the cavity 122 of the lower housing 120, across the hinge 112, and through the cavity 132 of the upper housing 130. The fiber optic cable is flexible and may be coiled in the hinge 112 (e.g., about the pivot extension 124A) as shown.

The fiber optic cable 150 is adapted to serve as a waveguide for optical signals. The optical signals may be optical data signals. The signals may be modulated light embodying digital and/or analog signals, for example. The signals may vary in frequency and/or intensity, for example. A signal converter 152 is mounted on and electrically connected to the PCB 140 and a signal converter 154 is mounted on and electrically connected to the PCB 142. The signal converters 152, 154 may be soldered onto the respective PCBs 140, 142. Alternatively or additionally, the signal converters 152, 154 may be embedded into the respective PCBs 140, 142. The signal converters 152, 154 may be fiber optic interface modules. The signal converter 152 includes an optical transmitter that encodes or converts electrical analog or digital output signals from the PCB 140 to corresponding optical signals, which are transmitted to the signal converter 154 through the fiber optic cable 150. The signal converter 154 decodes or converts the received optical signals back into electrical analog or digital input signals, which may be identical or substantially identical to the original electrical signals provided to the signal converter 152.

According to some embodiments, the signal converters 152, 154 are each fiber optic or optical transceivers so that each of the optical transceivers 152, 154 is capable of operating as an optical receiver and an optical transmitter to enable bi-directional signaling. The optical transmitters may employ a light emitting diode (LED) or a laser diode to generate the optical signals. The optical receivers may employ a photodiode (e.g., PIN-type or avalanche-type) to detect the optical signals. Suitable optical transceivers, receivers and transmitters for the signal converters 150, 152 are available from Stanley Electric Co., Ltd. of Japan.

According to some embodiments and as best seen in FIG. 7, the fiber optic cable 150 includes a core 150A, a cladding layer 150B surrounding the core, and a buffer layer or coating 150C surrounding the cladding layer 150B. The operation of fiber optic cables as described herein will be appreciated by those of skill in the art. Generally, the index of refraction of the cladding layer 150B is lower than that of the core 150A so that light passing through the core 150A is reflected back into the core 150A by the cladding layer 150B.

According to some embodiments, the core 150A has a nominal outer diameter of between about 1 and 8 mm. According to some embodiments, the cladding layer 150B has a nominal outer diameter of between about 1 and 15 mm.

The core 150A may be formed of a plastic or polymeric material such as polymethyl-methacrylate (PMMA) resin, polystyrene or polycarbonate. The cladding layer 150B may be formed of a plastic or polymeric material such as fluorinated polymer. The buffer layer 150C may be formed of a plastic or polymeric material such as polyethylene, PVC or nylon. Alternatively, the core 150A and the cladding layer 150B may be formed of glass. Plastic core fiber optic cables may provide advantages in cost and flexibility while meeting requirements for strength, signal capacity and signal degradation/loss.

A further coating or jacket (not shown) may be applied about the buffer layer 150C. The core 150A and/or the cladding layer 150B may include multiple segments or sections. According to some embodiments, the fiber optic cable is a multimode fiber optic cable.

The housing 110 and the fiber optic cable 150 are relatively arranged and constructed such that no portion of the fiber optic cable 150 is bent at a bend radius less than a minimum bend radius of the fiber optic cable 150. The minimum bend radius is the smallest radius to which a cable can be bent without damaging the fiber. To accommodate the range of articulation of the housings 120, 130 without overbending any portion of the fiber optic cable 150, the fiber optic cable 150 may be provided with extra length and the housing 110 may be provided with an expansion volume in the hinge region, for example. According to some embodiments, the fiber optic cable 150 has a minimum bend radius of about one-half inch or less. According to some embodiments, the fiber optic cable 150 has a minimum bend radius of about one-quarter inch or less. According to some embodiments, the fiber optic cable 150 has a minimum bend radius of three times the diameter of the fiber optic cable 150 or less.

Suitable fiber optic cables for the cable 150 may include Gk-20 plastic optical fiber (with suitable plastic buffer layer or jacket, for example, GH2001 or GH2002 cable) available from Mitsubishi Rayon Co., Ltd. of Japan. The fiber optic cable 150 is exemplary and it will be appreciated by those of skill in the art that otherwise constructed fiber optic cables may be employed in accordance with embodiments of the invention.

Referring to FIGS. 3 and 6, a fiber optic cable 160 may be employed to operatively connect the PCB 140 (or another PCB or other electronic component) to the camera module 144. The camera module 144 includes a lens 144A and a sensor unit 144B.

The sensor unit 144B includes an image sensor (e.g., a charge coupled device (CCD) or a complementary metal oxide semiconductor (CMOS)), which may be a Bayer pattern sensor. The image sensor may include an array of pixels and readout electronics (e.g., a processor) and an analog-to-digital converter (ADC) that read raw data from the image sensor. The image sensor may further include a CPU or processor that serves to process, modify, convert and/or compress the raw data. The processor may be operative to convert the raw data to RGB and/or YUV data, and may further include a coder and/or decoder (codec) operative to compress the data (e.g., to jpeg format). However, according to some embodiments of the present invention, the sensor unit 144B does not include a processor to compress the raw data, and may also not include a processor to convert the raw data. According to some embodiments, the camera module 144 has a picture resolution of at least CIF 100K pixels.

A signal converter 162 and a signal converter 164, corresponding to the signal converters 152 and 154, are operatively connected to the PCB 140 and the sensor unit 144A, respectively. The signal converter 164 may be an optical transmitter or transceiver and the signal converter 162 may be an optical receiver or transceiver. The electrical signals from the sensor unit 144B are converted to optical data signals by the signal converter 164, transmitted through the fiber optic cable 160, and converted to electrical data signals by the signal converter 162, which are provided to the PCB 140.

According to some embodiments, the data transfer rate between the sensor unit 144A and the PCB 140 via the fiber optic cable 160 is at least 10 megabits/second (Mbit/sec). According to some embodiments, the data transfer rate is at least 50 Mbit/sec.

In the foregoing manner, the fiber optic cable 160 may take the place of multiple electrical conductor cables, wires and flexible printed circuits or tapes (collectively, electrical connector cables) as may be conventionally employed to connect a camera module to a main PCB or the like in a mobile terminal. In this regard, the fiber optic cable 160 may provide a number of advantages over at least certain electrical connector cables. When data is transferred at a high rate over such an electrical connector cable, the electrical connector cable may to emit electromagnetic signals that may present electromagnetic interference (EMI) and radiofrequency interference (RFI) that may adversely affect other components of the mobile terminal. In order to reduce EMI, such connector cables may be shielded or mechanisms may be employed to filter EMI or reduce the required data transfer rate (e.g., the camera module may include a processor to compress the data as described above) to reduce EMI. Such measures may necessitate undesirable additional cost and/or device size and/or reduced performance. The fiber optic cable 160 can typically accommodate high data transfer rates without emitting electromagnetic radiation. Thus, the fiber optic cable 160 and signal converters 162, 164 may reduce or eliminate the need for shielding and/or a processor capable of data compression (e.g., codec compression).

Electrical connector cables as discussed above may require a large number of connections to the camera module 144. These connections may impose additional cost and space requirements and may be unreliable. The fiber optic cable 160 may eliminate the need for such a multiplicity of connections and the associated drawbacks.

As discussed above, an electronic device in accordance with the present invention may include a fiber optic cable with a transceiver operably mounted at either end thereof to allow two-way signal transmission. According to some embodiments, two fiber optic cables, two optical transmitters and two optical receivers may be employed in place of the single optical fiber and the two transceivers. The first of the two optical fibers includes an optical receiver at a first end and an optical transmitter at a second end, and the second optical fiber has an optical transmitter and an optical receiver mounted on its corresponding first and second ends. The two optical fibers and the associated receivers and transmitters can thus be used to provide bi-directional signaling (i.e., one-way signaling in either direction via each fiber optic cable).

The foregoing embodiments are exemplary and it will be appreciated from the description herein that, in accordance with the present invention, fiber optic cables and signal converters (e.g., optical receivers, transmitters, and transceivers) may be employed to connect electronic components other than a display or a camera module in a housing assembly. For example, electronic components such as a speaker, a receiver, a microphone, or an audio jack may be connected to a PCB or other electronic component using a fiber optic cable and signal converters as described.

According to some embodiments and as illustrated, the entirety of the camera module 144 may be integral with the housing 110. According to other embodiments, only a portion of the camera module 144 is integral with the housing 110. According to further embodiments, the camera module 144 is not integral with the housing 144 but is adapted to be removably coupled on the housing 110. Likewise, other electrical components, as discussed above, may be fully or partially integral with the associated housing or removably mounted on the housing.

Also, while the fiber optic cable 160 as discussed above is employed to connect a camera module 144 and a PCB 140, connection of other high speed data transfer devices is also contemplated. For example, a fiber optic cable and associated signal converters may be employed to connect other high speed interface devices such as a speaker, a receiver or a microphone. According to some embodiments, the data transfer rate between the high-speed interface device(s) via the fiber optic cable 160 is at least 10 Mbit/sec. According to some embodiments, the data transfer rate is at least 50 Mbit/sec.

Figure 8:
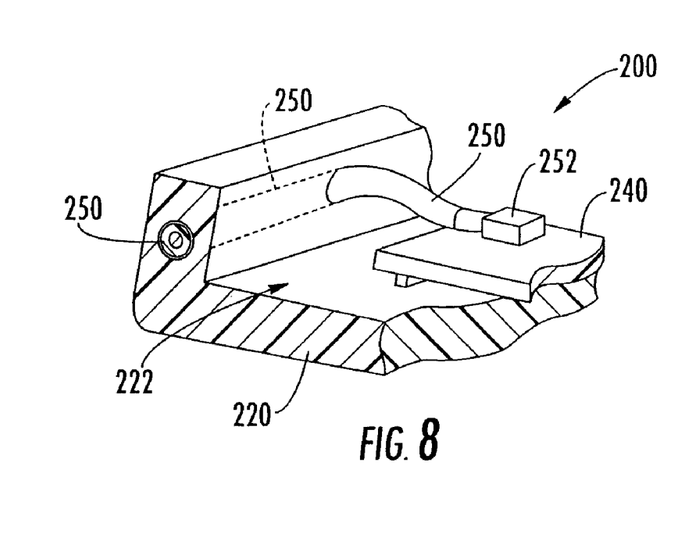
FIG. 8 is a fragmentary, enlarged, perspective view of an electronic device according to further embodiments of the present invention.

With reference to FIG. 8, an electronic device 200 according to some embodiments of the present invention is shown therein. The electronic device includes a housing 220, a cavity 222 defined within the housing 220, a PCB 240 disposed in the cavity 222, and a fiber optic cable 250 operatively connected to the PCB 240 by a signal converter 252 (e.g., an optical receiver, transmitter or transceiver) and to another electronic component by a second signal converter (not shown). The device 200 may be constructed as describe above with regard to the mobile terminal 100 except as follows. A portion of the fiber optic cable 250 is embedded into the housing 220. The housing 220 may be molded about the fiber optic cable 250. According to some embodiments, the portion of the fiber optic cable 250 is insert molded into the housing 220. According to some embodiments, the materials of the housing 220 and the fiber optic cable 250 are selected such that the housing material is moldable at a temperature less than the glass transition temperature of the fiber optic cable 250. Suitable materials for the housing 220 may include polyester, polystyrene, polyvinyl chloride (PVC), and combinations thereof.

Figure 9:
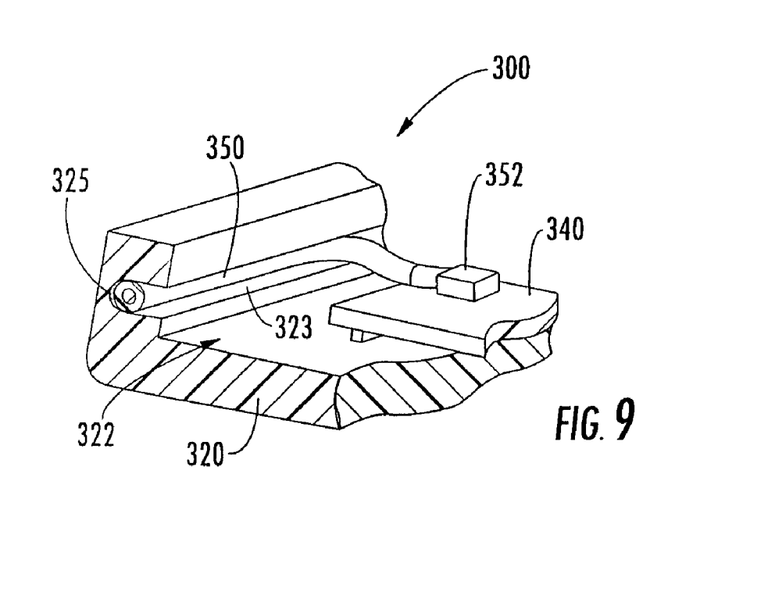
FIG. 9 is a fragmentary, enlarged, perspective view of an electronic device according to further embodiments of the present invention.

With reference to FIG. 9, an electronic device 300 according to some embodiments of the present invention is shown therein. The electronic device includes a housing 320, a cavity 322 defined within the housing 320, a PCB 340 disposed in the cavity 322, and a fiber optic cable 350 operatively connected to the PCB 340 by a signal converter 352 (e.g., an optical receiver, transmitter or transceiver) and to another electronic component by a second signal converter (not shown). The device 300 may be constructed as describe above with regard to the mobile terminal 100 except as follows. A channel 323 is defined in the housing 320. A portion of the fiber optic cable 350 is disposed in the channel 323. The channel 323 may be sized and shaped such that the fiber optic cable 350 is retained in the channel 323 by an interference fit. The fiber optic cable 350 may be press fit into the channel 323. Additionally or alternatively, the fiber optic cable 350 may be secured in the channel 323 by a layer of adhesive 325. The adhesive layer 325 may be a stand alone adhesive layer or an adhesive-coated tape (e.g., a double-sided tape) or the like.

Figure 10:
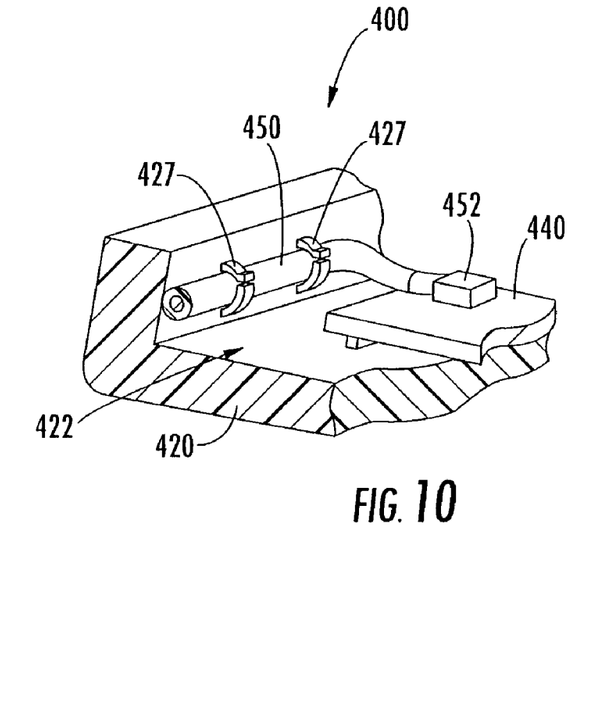
FIG. 10 is a fragmentary, enlarged, perspective view of an electronic device according to further embodiments of the present invention.

With reference to FIG. 10, an electronic device 400 according to some embodiments of the present invention is shown therein. The electronic device includes a housing 420, a cavity 422 defined within the housing 420, a PCB 440 disposed in the cavity 422, and a fiber optic cable 450 operatively connected to the PCB 440 by a signal converter 452 (e.g., an optical receiver, transmitter or transceiver) and to another electronic component by a second signal converter (not shown). The device 400 may be constructed as describe above with regard to the mobile terminal 100 except as follows. A portion of the fiber optic cable 450 is secured to the housing 420 by one or more snaps or clips 427. As illustrated, the clip(s) 427 may be integral with the housing 420 and, in accordance with some embodiments, integrally molded with the housing 420. The clip(s) may be adapted to permit removal and reattachment of the fiber optic cable 450. The clips 427 may be configured differently than illustrated in FIG. 10.

The fiber optic cables may be used in housings of other designs. For example, the housing may be of a one piece configuration rather than a clamshell configuration. The housing assembly may include two housings that are movably connected to one another by a mechanism other than a hinge with the fiber optic cable extending between and through the two housings to connect respective electronic components disposed therein. For example, the two housings may be slidably connected.

Fiber optic cable connections as described herein may provide a number of advantages. The fiber optic cables may provide high data transfer capacity with reduced size and cost. The number of connecting elements (e.g., electrically conductive wires or lines) required may be reduced. The fiber optic cable can provide improved robustness, flexibility, physical integrity, signal isolation, signal degradation and loss reduction, and signal throughput or capacity. The fiber optic cable may reduce or substantially eliminate EMI/RFI emission and susceptibility associated with the connection.

Although the present invention may be embodied in mobile communication devices or systems, such as the mobile wireless communication terminal 100, certain embodiments of the present invention are not limited to such devices and/or systems. Rather, some embodiments of the present invention may include electronic devices that are not communications devices and/or are not portable, mobile or handheld. For example, in accordance with the present invention, fiber optic cable may be routed through a housing of a portable or handheld device that is not a wireless communication device, such as a personal data assistant (PDA), a laptop or palmtop computer, a bar code reader, or the like to an electronic component in the housing. A fiber optic cable may extend between movably connected (e.g., hingedly connected) housings of a non-portable device. A fiber optic cable, an associated fiber optic transmitter and an associated fiber optic receiver as described above may be disposed in a housing that is mobile or non-mobile.

While the fiber optic cables are described above as used for transmitting signals, according to some embodiments, fiber optic cables can be used to provide lighting. According to some embodiments, fiber optic cables are used as light pipes that transmit and direct visible light to illuminate a portion of the associated device. For example, the signal converter 152 may be replaced with a light source such as an LED and the fiber optic cable 150 may be positioned to serve as a backlight for the display 28, the keypad 26 or the like. Fiber optic cables used as light pipes or lighting mechanisms may be combined with various aspects as disclosed herein. For example, such fiber optic cables may be molded into or otherwise secured to a housing and/or routed across a hinge between two housings.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

That which is claimed is:

1. A handheld, personal electronic device comprising:
    a handheld device housing including a first housing and a second housing movably coupled to the first housing by a hinge pivotally connecting the first and second housings;
    an electronic component disposed in the handheld device housing; and
    a fiber optic cable routed through the handheld device housing and operably connected to the electronic component to permit transmission of optical signals to and/or from the electronic component via the fiber optic cable;
    wherein the fiber optic cable extends between the first and second housings and across the hinge and is coiled in the hinge.

2. The device of claim 1 wherein the device is a handheld wireless communications device.

3. The device of claim 1 wherein the handheld device housing and the fiber optic cable are relatively arranged and constructed such that the first and second housings can be relatively pivotally moved between a first position and a second position without bending the fiber optic cable to a bend radius less than a minimum bend radius of the fiber optic cable.

4. The device of claim 3 wherein the fiber optic cable includes an extra length portion and the handheld device housing defines an expansion volume adjacent the hinge to accommodate relative movement between the first and second housings between the first position and the second position without bending the fiber optic cable to a bend radius less than a minimum bend radius of the fiber optic cable.

5. The device of claim 1 wherein:
    the first electronic component is disposed in the first housing;
    a second electronic component is disposed in the second housing; and the fiber optic cable operatively connects the first and second electronic components to permit transmission of optical signals therebetween via the fiber optic cable.

6. The device of claim 5 wherein the first electronic component includes a display and the second electronic component includes a printed circuit board.

7. The device of claim 1 wherein the electronic component includes a processor.

8. The device of claim 7 wherein the electronic component includes a printed circuit board and wherein the processor forms a part of the printed circuit board.

9. The device of claim 1 including:
a first signal converter connecting the fiber optic cable to the electronic component, wherein the first signal converter includes at least one of an optical receiver and an optical transmitter; and
a second signal converter including at least one of an optical receiver and an optical transmitter, wherein:
the first and second signal converters are each disposed in and/or on the handheld device housing; and
the fiber optic cable operatively connects the first and second signal converters to permit transmission of optical signals therebetween via the fiber optic cable.

10. The device of claim 9 wherein at least one of the first and second signal converters includes an optical transceiver.

11. The device of claim 1 including a second electronic component mounted in and/or on the handheld device housing and operably connected to the fiber optic cable to permit transmission of optical signals between the first and second electronic components via the fiber optic cable.

12. The device of claim 11 wherein the second electronic component is operative to transfer data to the first component at a rate of at least about 10 Mbit/sec.

13. The device of claim 11 wherein the second electronic component includes a digital camera.

14. The device of claim 1 wherein at least a portion of the fiber optic cable is secured to the handheld device housing.

15. The device of claim 14 wherein the fiber optic cable is embedded into the handheld device housing.

16. The device of claim 15 wherein the fiber optic cable is molded into the handheld device housing.

17. The device of claim 14 wherein:
the handheld device housing includes a housing wall having a channel therein; and
the fiber optic cable is disposed in the channel.

18. The device of claim 17 wherein the fiber optic cable is adhered within the channel.

19. The device of claim 17 wherein the fiber optic cable is press-fitted within the channel.

20. The device of claim 14 wherein:
the handheld device housing includes an integral clip; and
the fiber optic cable is secured to the handheld device housing by the clip.

21. A handheld, personal electronic device comprising:
a handheld device housing;
an electronic component disposed in the handheld device housing;
a fiber optic cable routed through the handheld device housing and operably connected to the electronic component to permit transmission of optical signals to and/or from the electronic component via the fiber optic cable; and
a first signal converter connecting the fiber optic cable to the electronic component, wherein the first signal converter includes at least one of an optical receiver and an optical transmitter;
a second signal converter including at least one of an optical receiver and an optical transmitter;
wherein:
the first and second signal converters are each disposed in and/or on the handheld device housing; and
the fiber optic cable operatively connects the first and second signal converters to permit transmission of optical signals therebetween via the fiber optic cable;
wherein at least a portion of the fiber optic cable is secured to the handheld device housing;
wherein the fiber optic cable is embedded into the handheld device housing; and
wherein the fiber optic cable is molded into the handheld device housing.

22. The device of claim 21 wherein the electronic component includes a processor.

23. The device of claim 22 wherein the electronic component includes a printed circuit board and wherein the processor forms a part of the printed circuit board.

24. The device of claim 21 wherein the fiber optic cable includes a core having a first index of refraction and a cladding layer surrounding the core and having a second index of refraction that is lower than the index of refraction of the core.

25. The device of claim 21 wherein the fiber optic cable is insert molded into the handheld device housing.

26. A handheld, personal electronic device comprising:
a handheld device housing;
an electronic component disposed in the handheld device housing; and
a fiber optic cable routed through the handheld device housing and operably connected to the electronic component to permit transmission of optical signals to and/or from the electronic component via the fiber optic cable;
wherein at least a portion of the fiber optic cable is secured to the handheld device housing;
wherein the handheld device housing includes a housing wall having a channel therein; and
wherein the fiber optic cable is disposed and secured in the channel.

27. The device of claim 26 wherein the fiber optic cable is adhered within the channel.

28. The device of claim 26 wherein the fiber optic cable is press-fitted within the channel.

29. A handheld, personal electronic device comprising:
a handheld device housing;
an electronic component disposed in the handheld device housing; and
a fiber optic cable routed through the handheld device housing and operably connected to the electronic component to permit transmission of optical signals to and/or from the electronic component via the fiber optic cable;
wherein at least a portion of the fiber optic cable is secured to the handheld device housing;
wherein the handheld device housing includes an integral clip; and
wherein the fiber optic cable is secured to the handheld device housing by the clip.

30. A handheld, personal electronic device comprising:
a handheld device housing;
an electronic component disposed in the handheld device housing; and
a fiber optic cable routed through the handheld device housing and operably connected to the electronic component to permit transmission of optical signals to and/or from the electronic component via the fiber optic cable;

wherein at least a portion of the fiber optic cable is secured to the handheld device housing;

wherein the fiber optic cable is embedded into the handheld device housing;

wherein the fiber optic cable is molded into the handheld device housing; and wherein:
the handheld device housing includes a first housing and a second housing movably coupled to the first housing; and
the fiber optic cable extends between the first and second housings.

31. The device of claim 30 wherein the handheld device housing and the fiber optic cable are relatively arranged and constructed such that the first and second housings can be relatively moved between a first position and a second position without bending the fiber optic cable to a bend radius less than a minimum bend radius of the fiber optic cable.

32. The device of claim 30 wherein the handheld device housing includes a hinge pivotally connecting the first and second housings and the fiber optic cable extends across the hinge.

33. The device of claim 30 wherein:
the first electronic component is disposed in the first housing;
a second electronic component is disposed in the second housing; and
the fiber optic cable operatively connects the first and second electronic components to permit transmission of optical signals therebetween via the fiber optic cable.

34. The device of claim 33 wherein the first electronic component includes a display and the second electronic component includes a printed circuit board.

35. A handheld, personal electronic device comprising:
a handheld device housing;
an electronic component disposed in the handheld device housing;
a fiber optic cable routed through the handheld device housing and operably connected to the electronic component to permit transmission of optical signals to and/or from the electronic component via the fiber optic cable; and
a signal converter connecting the fiber optic cable to the electronic component, wherein the signal converter includes at least one of an optical receiver and an optical transmitter
wherein at least a portion of the fiber optic cable is secured to the handheld device housing;
wherein the fiber optic cable is embedded into the handheld device housing; wherein the fiber optic cable is molded into the handheld device housing; and
wherein the signal converter includes an optical transceiver.

36. A handheld, personal electronic device comprising:
a handheld device housing;
a first electronic component disposed in the handheld device housing;
a fiber optic cable routed through the handheld device housing and operably connected to the first electronic component to permit transmission of optical signals to and/or from the first electronic component via the fiber optic cable; and
a second electronic component mounted in and/or on the handheld device housing and operably connected to the fiber optic cable to permit transmission of optical signals between the first and second electronic components via the fiber optic cable;
wherein at least a portion of the fiber optic cable is secured to the handheld device housing;
wherein the fiber optic cable is embedded into the handheld device housing; and
wherein the fiber optic cable is molded into the handheld device housing.

37. The device of claim 36 wherein the second electronic component is operative to transfer data to the first component at a rate of at least about 10 Mbit/sec.

38. The device of claim 36 wherein the second electronic component includes a digital camera.

* * * * *